Nov. 1, 1938.   L. H. VON OHLSEN   2,134,900
SPEED CONTROL OF MOTORS
Filed Dec. 28, 1935

INVENTOR
Louis H. Von Ohlsen
BY
Blair, Curtis & Dunne
ATTORNEYS

Patented Nov. 1, 1938

2,134,900

UNITED STATES PATENT OFFICE 2,134,900

SPEED CONTROL OF MOTORS

Louis H. Von Ohlsen, New Haven, Conn., assignor to The Safety Car Heating & Lighting Company, a corporation of New Jersey Application December 28, 1935, Serial No. 56,402

5 Claims. (Cl. 171—223)

This invention relates to the control of the speed of electric motors particularly in installations where the terminal voltage of the energy supplied to the motor is subjected to relatively wide fluctuations or changes.

One of the objects of the invention is to provide a motor speed control arrangement and system which will be inexpensive, simple and compact, of thoroughly dependable action and well adapted to meet the varying requirements of practical use. Another object is to provide an arrangement and system for speed control of electric motors in which the first cost will be relatively small, cost of maintenance relatively small or negligible, and that will be characterized by substantial freedom from moving parts. Another object is to provide an electric motor construction and speed control therefor capable of embodiment in compact and substantially unitary form, that will be as a unit inexpensive, and that, though the motor has such a speed control embodied therein, will have weight and space factors substantially the same as those of the motor itself. Another object is to provide a simple and thoroughly practical means, free from expensive complications and free from the needs and expense of such factors as supervision and maintenance, for counteracting the effects on the speed of an electric motor of substantial changes in the voltage applied to the motor and of temperature changes in the motor field circuit itself. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

Figure 1:
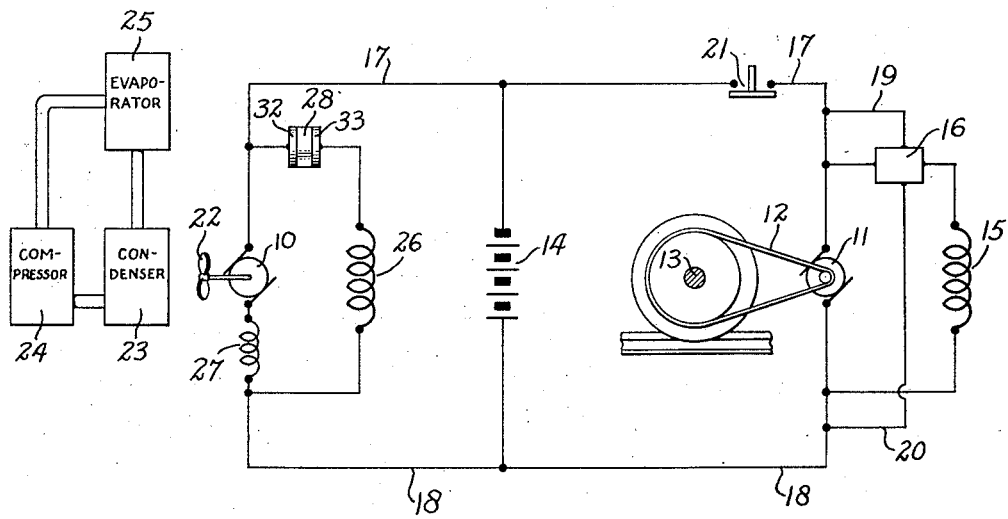
Figure 2:
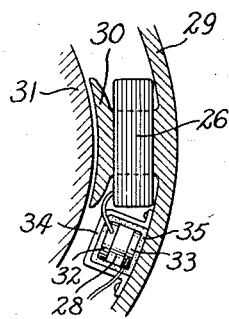

In the accompanying drawing in which is shown one of the various possible embodiments of my invention, Figure 1 is a diagrammatic representation of a motor-speed regulating or controlling system, and Figure 2 is a fragmentary end elevation of the motor that is diagrammatically shown in Figure 1, showing the interrelation therewith of certain other features and parts of my invention.

Similar reference characters refer to similar parts throughout the several views in the drawing.

As conducive to a clearer understanding of certain features of my invention, it may at this point be noted that in certain installations of direct current motors the voltage of the source supplying energy to the motor is subjected, sometime inherent and sometimes due to various circumstances, to relatively wide changes and that, where the motor is particularly of the shunt field type, the resultant changes in voltage bring about detrimental departures from the intended or desired speed of the motor and hence of the device which the motor is driving.

An illustrative installation or system of the above-mentioned type is diagrammatically shown in Figure 1 in which the motor 10 is part of an air conditioning or refrigerating system installed on a railway car and derives its energy from a generator 11 driven in any suitable manner as by a belt 12 from a car axle 13, and from a storage battery 14 intended to be charged by the generator 11 when the car is operating at a sufficient speed. The generator 11 may be a shunt generator having a shunt field 15 in the circuit of which is any suitable regulator diagrammatically indicated at 16, preferably provided with a voltage coil (not shown) connected to the main line conductors 17 and 18 through the conductors 19 and 20.

In such a system, suited to function in connection with a 16-cell lead battery, the voltage across the conductors 17—18 and through which the motor 10 derives its energy may vary throughout relatively wide limits, depending upon various factors, such as the state of charge of the battery 14, whether or not the generator is charging the battery, the speed of movement of the railway car, and like factors. For example, assuming that the car and hence the generator is standing still. The automatic switch, diagrammatically indicated at 21, stands open and the motor 10 depends upon the battery 14 for its energy. The battery may be in a low state of charge and its voltage may be in the neighborhood of 25 or 26 volts, that being a voltage materially below the intended voltage of operation of the motor 10. The result is that the power output of the motor 10 is greatly reduced for its speed of drive is much lower than normal and the intended operation of various or certain devices which depend upon the speed of the motor 10 cannot be achieved.

For example, let it be assumed that the motor 10 drives the fan or blower 22 to move air over or through a condenser 23 of a refrigerating system which includes a compressor 24 driven in any suitable way, not shown, to compress refrigerant received from the evaporator 25 and pass it on to the condenser 23 from which it is supplied for evaporation to the evaporator 25. With the motor 10 operating at this greatly reduced speed the delivery of air may and sometimes is so greatly reduced as to render the refrigerating equipment substantially inoperative.

On the other hand, let it be assumed that the train is moving at a suitable speed to be charging the battery 14 at its full rate of charge and that the battery is approaching a state of full charge; in that case the main switch 21 is closed and the voltage across the conductors 17—18 may be in the neighborhood of 39, 40 or even 42 volts. In such case, the speed of the motor 10 is too high and the fan 22 delivers an excess of air, resulting in extreme inefficiency and also in greater power consumption.

If the motor 10 were designed or constructed to deliver the required quantity of air at the lowest voltage of operation, say around 25 or 26 volts, the excess of air delivered at voltages above the minimum increases with the rise in voltage above that minimum, still greater inefficiency results and the greater power requirements have to be met.

Additionally, there exists a further complication in the fact that the speed of the motor 10 varies with changes in temperature of its field winding 26. As the latter heats up, its resistance increases and affects the motor speed. Particularly at such times when the voltage is too high and the motor speed is already too high, the effect of the increase in resistance of the field, due to its increase in temperature, is still further to increase the speed of the motor 10, thus increasing the excess of air delivered to the condenser 23.

The motor 10 which is diagrammatically shown as a shunt motor having the shunt field 26 may, however, if desired, be compounded either differentially or cumulatively, as may be desired, and hence may have a series field winding diagrammatically shown at 27. To overcome such deficiencies and disadvantages as are outlined above, I relate both to the shunt field circuit and to the field frame of the motor a resistance device 28 having certain characteristics later described; the frame of the motor 10 is fragmentarily shown in Figure 2 and will be seen to comprise a suitable annular frame 29 having a suitable number of pole pieces, only one of which is shown and indicated at 30, carrying the shunt field winding 26 in a suitable number of coils related to the pole pieces and with respect to the latter the armature 31 is rotatably related in any suitable or known manner.

The resistance device 28 (Figures 1 and 2) comprises a suitably shaped and dimensioned resistance material of appropriate electrical and thermal characteristics and illustratively and preferably is comprised of a disk of a material commercially known as "Thyrite" described in United States Patent 1,822,742. This "Thyrite" material has mechanical characteristics somewhat similar to those of dry-process porcelain and has the characteristic that its conductivity varies with the potential or voltage. For example, the ohmic resistance of "Thyrite" is equal to a constant (which depends upon the physical dimensions of the material to be employed) divided by the current to the exponential $a$, as set forth in the above-mentioned United States patent. By way of illustration of the action of this material "Thyrite" its above-mentioned properties are of such a character that, for example, doubling the voltage results in a flow of current therethrough, the magnitude of which is on the order of 12 times the magnitude of the current flowing before the voltage was doubled. It therefore has an asymmetrical voltage-current characteristic. Furthermore, it also has a negative temperature coefficient of resistance, in that its ohmic resistance decreases with increases in temperature.

Now this material "Thyrite", which may be given any suitable or appropriate shape or form and illustratively and most conveniently in the form of the disk 28 (Figures 1 and 2), is electrically inserted in series with the shunt field winding 26 of the motor 10, as shown in Figure 1, and this is done by way of two metallic electrodes or conductive members 32 and 33, each to one side of the "Thyrite" disk 28 and hence making good electrical and thermal contact with the "Thyrite" disk member 28 on both of its faces and thereby insuring that the "Thyrite" material is effectively included in the circuit, the conductors of the shunt field circuit being connected to the conductive members 32 and 33, as shown in Figure 1.

The three members 33, 28 and 32 (see now Figure 2) may be stacked, as it were, and are thermally related to the field frame 29 in close proximity to the shunt field winding 26 so that the temperature changes of the latter are transmitted to the "Thyrite" disk 28. Conveniently, the resultant stack of disk-like parts may be mounted and secured upon the inside of the field frame 29 by means of a suitable metallic strap 34 which, suitably secured to the field frame 29, virtually clamps the three disk-like members securely against the inside flat face of the field frame 29, suitable non-conductive material 35 electrically but not thermally insulating the parts 33, 28 and 32 from the motor frame 29 and the securing strap 34.

Accordingly, the resistance material 28, having, as above noted, a negative temperature coefficient of resistance, becomes in effect thermally related to the field 26 of the motor.

Now with this arrangement, as just described and as shown in the drawing, and with the above-described asymmetrical characteristic of the material appropriately related to the voltage changes of the circuit in which it is to be effective, the motor 10 (Figure 1) can be constructed to give the desired speed at the lowest voltage at which it is to operate and will thereafter, that is, upon increase in voltage, depart but little from that desired speed. This may be explained somewhat as follows:—

Bearing in mind that the speed of a direct current motor is a direct function of the voltage applied to the armature and varies inversely with the field flux, it will be seen that, to increase to the same extent both the voltage applied to the armature and the voltage across the field winding (the motor being a shunt motor), tends to have a compensating effect in that, broadly stated, the excitation increases as does also the voltage across the armature increase. The increase, however, in the actual field strength or flux of the shunt field depends upon the saturation characteristic of the iron used in the motor, particularly the field structure. Even by making the iron parts large so that they operate substantially below the saturation point, there will still be an increase in speed with increase in voltage across both the armature and the field, but even at that the increase in field strength will not be rapid enough.

But the above described characteristics of the "Thyrite" member make up this deficiency for the voltage-resistance characteristic of the latter is such that, as the voltage increases, the resistance decreases and the current therethrough increases. Accordingly, I am enabled to cause such a greater or more rapid increase in current through the field 26 as compared to the increase or rate of increase in voltage across the armature 19 that the above-described deficiencies caused by the saturation characteristic of the iron employed may be and are compensated for. This combination is hence such that the field strength, irrespective of the particular operating point on the saturation characteristic, produced by the motor field, is just about the correct value for whatever happens to be the voltage across the armature 10 to give the motor the desired or intended speed, and this throughout whatever is the operating range of change in voltage.

But due also to the negative temperature coefficient of resistance of the "Thyrite" member 28, and due to the above-described arrangement relating it thermally to the field winding, changes in excitation due to changes in temperature of the field winding 26 are also prevented from materially affecting the speed of the motor.

Accordingly, the delivery of the proper amount of air to the air conditioning or refrigerating apparatus may be reliably assured even though the voltage of the supply system varies throughout wide ranges, and at the same time greatly improved efficiency, both of the power supply system and of the refrigerating or air conditioning system, is achieved.

By way of example, and as illustrative of the efficacy of my invention, it might be noted that in one instance a motor operating in a normal manner and without my invention embodied therewith underwent a speed change from 1100 R. P. M. to 1353 R. P. M. (a speed change of 21%) as a result of a change in its terminal voltage from 27.8 volts to 38.7 volts (a voltage change of about 30%). The same motor, however, when embodied in my invention as above described, and when subjected to a voltage change of about 30%, namely, from 27.7 volts to 37.6 volts met with a speed change of only about 5%, namely, 1165 R. P. M. to 1283 R. P. M. In the former instance such disadvantages and defects as earlier above set forth would result; in the latter instance they are avoided and far superior efficiency and economy achieved.

It will thus be seen that there has been provided in this invention a system and apparatus in which the various objects above noted, together with many thoroughly practical advantages are successfully achieved. It will be noted that the apparatus may be physically constructed in exceedingly efficient and compact form, the weight and space factors of the motor are virtually not materially affected, moving parts can be entirely eliminated, and the maintenance factor of both motor and its control unit become far superior to known or other methods. Furthermore, it will be seen that the system and apparatus are thoroughly practical and well adapted to meet the varying conditions of hard practical use.

As many possible embodiments may be made of the above invention and as many changes might be made in the embodiment above set forth, it is to be understood that all matter hereinbefore set forth, or shown in the accompanying drawing, is to be interpreted as illustrative and not in a limiting sense.

I claim:—

1. In a speed regulating system for electric motors, in combination, a motor having a field frame having a field winding thereon and an armature, a resistance member having a negative temperature coefficient of resistance and having the characteristic that its ohmic resistance is equal to a constant divided by the current to the exponential $a$, said member having opposed plane faces and having a plane metallic member thermally and conductively related to each of said faces, means electrically non-conductively mounting said three members on said field frame but in thermal relation to said field winding, and conductors electrically connected to said metallic members for placing said resistance member and said field winding in circuit with each other.

2. In a speed regulating system for electric motors, in combination, a shunt field winding having predetermined resistance characteristics and predetermined heat dissipating characteristics, and a "Thyrite" resistance in the circuit with said field winding and thermally related thereto in such a manner that said "Thyrite" resistance will be substantially the same temperature as said field winding at all times.

3. In apparatus for controlling the current through a winding of an electric motor, comprising, a resistance unit mounted adjacent said winding and being connected in the circuit of said winding, said resistance unit having a negative resistance current characteristic and a negative resistance temperature characteristic, the resistance and the negative resistance current characteristic of said resistance unit being such that when a constant voltage is impressed upon said circuit the current through said winding will be constant when the temperatures of said field winding and said resistance unit are the same, the thermal relationship of said field winding and said resistance unit being such that during normal operation of the motor the temperature of said resistance unit will be the same as the temperature of said field winding.

4. In a speed regulating system for electric motors, in combination, a motor having a field frame, a shunt field winding having predetermined resistance characteristics and predetermined heat dissipating characteristics mounted on said field frame to extend inwardly from the inner surface of said field frame, a resistance device in circuit with said field winding having such a negative resistance current characteristic and such a negative resistance temperature characteristic that current through said winding will be constant when a voltage is impressed upon the circuit of said device and said field and when the temperatures of said field and said device are substantially the same, and means fastening said device to the inner surface of said frame immediately adjacent said winding to maintain substantially the same temperature in said field and said device.

5. In a speed regulating system for electric motors, in combination, a motor having a field frame, a shunt field winding having predetermined resistance characteristics and predetermined heat dissipating characteristics mounted on said field frame to extend inwardly from the inner surface of said field frame, a resistance device in circuit with said field winding having such a negative resistance current characteristic and such a negative resistance temperature characteristic that current through said winding will be constant when a voltage is impressed upon the circuit of said device and said field and when the temperatures of said field and said device are substantially the same, means fastening said device to the inner surface of said frame immediately adjacent said winding to maintain substantially the same temperature in said field and said device, and means electrically insulating said device from said frame, said means being a good heat conductor.

LOUIS H. VON OHLSEN.